(12) United States Patent
Cooper et al.

(10) Patent No.: US 11,064,819 B2
(45) Date of Patent: Jul. 20, 2021

(54) SPRUNG DISPLAY CASE FOR DISPENSING PRODUCTS

(71) Applicant: Metalfacture Ltd, Wigston (GB)

(72) Inventors: James Anthony Cooper, Wigston (GB); Benjamin James Jones-Fenleigh, Wigston (GB)

(73) Assignee: Metalfacture Ltd, Wigston (GB)

( * ) Notice: Subject to any disclaimer, the term of this patent is extended or adjusted under 35 U.S.C. 154(b) by 0 days.

(21) Appl. No.: 16/760,119

(22) PCT Filed: Dec. 10, 2018

(86) PCT No.: PCT/EP2018/084116
§ 371 (c)(1),
(2) Date: Apr. 29, 2020

(87) PCT Pub. No.: WO2019/115433
PCT Pub. Date: Jun. 20, 2019

(65) Prior Publication Data
US 2020/0329888 A1    Oct. 22, 2020

(30) Foreign Application Priority Data
Dec. 11, 2017   (GB) ..................... 1720618

(51) Int. Cl.
*B65G 1/07*    (2006.01)
*A47F 3/02*    (2006.01)
*A47F 3/06*    (2006.01)

(52) U.S. Cl.
CPC .............. *A47F 3/02* (2013.01); *A47F 3/06* (2013.01); *B65G 1/07* (2013.01); *B65G 2201/0235* (2013.01)

(58) Field of Classification Search
None
See application file for complete search history.

(56) References Cited

U.S. PATENT DOCUMENTS

| 3,004,813 A | 10/1961 | Shivek et al. |
| 3,675,912 A | 7/1972 | Jardins et al. |
| (Continued) | | |

FOREIGN PATENT DOCUMENTS

| GB | 0928218 | 6/1963 |
| WO | 9932018 A1 | 7/1999 |

OTHER PUBLICATIONS

UKIPO, Combined Search and Examination Report for corresponding GB Patent Application No. 1720618.6, dated Jun. 8, 2018, 9 pages.

(Continued)

*Primary Examiner* — Gene O Crawford
*Assistant Examiner* — Ayodeji T Ojofeitimi
(74) *Attorney, Agent, or Firm* — NK Patent Law

(57) ABSTRACT

A sprung display case for dispensing products, particularly heavy products such as beverage multipacks. The case comprises a vertical chamber that is open at an upper end and is sized and shaped such that a plurality of the products can be vertically stacked within the chamber; a horizontal platform that is mounted to be vertically slidable within the chamber, the platform having at least one air hole formed therethrough; a single resiliently compressible member mounted in the chamber between a lower side of the platform and an upper side of a base of the chamber to bias the platform towards the upper end of the chamber; and a tether fixed at a first end to the platform and at a second end to the base of the chamber to prevent the platform moving out of the upper end of the chamber.

13 Claims, 2 Drawing Sheets

(56) References Cited

U.S. PATENT DOCUMENTS

| | | |
|---|---|---|
| 3,806,218 A | 4/1974 | Cummings |
| 3,900,133 A | 8/1975 | Lisbin et al. |
| 4,927,053 A | 5/1990 | Mayfield, III |
| 5,813,569 A | 9/1998 | Cihanek |
| 2016/0129459 A1* | 5/2016 | Mizushima ......... B05B 11/0064 222/190 |

OTHER PUBLICATIONS

ISA/EP, International Search Report and Written Opinion for corresponding PCT Patent Application No. PCT/EP2018/084116, dated Feb. 11, 2019, 9 pages.

* cited by examiner

SPRUNG DISPLAY CASE FOR DISPENSING PRODUCTS

CROSS-REFERENCE TO RELATED APPLICATIONS

This application is a U.S. National Stage application of International Patent Application No. PCT/EP2018/084116, filed on Dec. 10, 2018, which claims priority to United Kingdom Patent Application No. 1720618.6, filed on Dec. 11, 2017, the entire content of all of which is incorporated by reference herein.

FIELD OF INVENTION

The present invention relates to the display of products in retail stores. The present invention provides an improved case for the display of products, particularly heavy products, at an easy to reach height, thereby avoiding the need for consumers to reach down and lift products from the floor.

BACKGROUND

Sprung display cases for various products have been available for a number of years. Perhaps the most common sprung display case are newspaper bins wherein a stack of newspapers are displayed in a vertical bin on a horizontal sprung platform. The bin is sized and shaped to conform to the size of the newspapers stacked therein. The sprung platform is formed such that the uppermost newspaper of the stack is always held at or about the top of the display case. That is, when a newspaper is removed from the bin the reduction in weight on the platform allows the platform to move a distance towards the top of the bin that is substantially equal to the thickness of the newspaper that has been removed. This is achieved by mounting one or more resilient compressible members, for example a spring, within the bin between a lower surface of the platform and an upper surface of the base of the bin. The resilient compressible member will be of a suitable strength to achieve the required displacement of the platform when a newspaper is removed. In this manner newspapers can be displayed in a simple manner that avoids the need for consumers to bend down and pick a newspaper from the bottom of a bin.

In light of the success of newspaper bins there has been a drive to provide display cases for a more varied range of products. Sprung display cases for various products have been produced with varying degrees of success. There is a particular need to provide sprung display cases for heavy products in order to remove the need for customers to lift the products from floor level or from a shelf. One particular product for which sprung display cases would be considered to be useful is multipacks of beverages. These products are heavy and of relatively standard size, making them ideal for display in a sprung display case. However, to date nobody has been able to produce a resilient and reliable sprung display case for multipack beverages. Currently these products, which are too heavy for most shelving units, are displayed in simple piles or stacks in "stack it up, pile it high" displays.

The necessary height of sprung display units for beverage multipacks and the weight of the products mean that it is not possible to simply mount a horizontal platform on a spring within a chamber in a straightforward manner without additional components. Attempts to construct simply sprung display units in this manner have shown the technical problems with this approach.

FIG. 1 shows a first prior art embodiment of a sprung display case for multipack beverages. The case 1 comprises a vertical chamber 2 open at an upper end, a horizontal platform 3 slidably mounted within the chamber 2, and a coil spring 4 mounted within the chamber 2 beneath the platform 3. In embodiments formed in this manner using conventional coil springs 4 it was found that if the case 1 is filled more than half full the spring 4 would snake in the manner shown in the Figure. This resulted in the case jamming ceasing to function.

In order to overcome the problems with the embodiment of FIG. 1, the cases were modified to include two springs and central plunger mounted between the two springs. This embodiment is shown in FIG. 2. In effect the single vertical spring is split in two by means of a central platform or plunger. The case 11 of FIG. 2 comprises a vertical chamber 12 open at an upper end, a horizontal platform 13 slidably mounted within the chamber 12, an upper coil spring 14 mounted within the chamber 12 directly beneath the platform 13, a central plunger 15 slidably mounted within the chamber 12 at a lower end of the upper coil spring 14, and a lower coil spring 16 mounted beneath the central plunger 15. The lower coil spring 16 is relatively more resilient than the upper coil spring 14. Both the horizontal platform 13 and the central plunger 15 were bespoke injection moulded components.

When the case 11 is loaded to approximately halfway, due to the relative strength of the upper and lower coil springs 14, 16 substantially all of the compression occurs in the upper coil spring 14 and there is little or no compression of the lower coil spring 16. When loaded further, the lower coil spring 16 would become compressed until the bin was full. The provision of two springs and a central plunger overcame the snaking issues present in the embodiment of FIG. 2 and this embodiment operates satisfactorily.

However, in the embodiment of FIG. 2 the requirement for two separate springs significantly reduces the capacity of the case 11 compared to the theoretical capacity of the case 1 of FIG. 1. Further the provision of two bespoke injection moulded components (the central plunger 15 and the plunger 13) makes the embodiment of FIG. 2 prohibitively expensive to manufacture. In light of this there is a need for an improved sprung display case that is capable of functioning properly when used with heavy products, such as beverage multipacks, and that is economical to produce in relatively small quantities for specifically sized products.

SUMMARY OF INVENTION

The present invention provides a sprung display case for dispensing products, the case comprising:
- a vertical chamber open at an upper end and sized and shaped such that a plurality of the products can be vertically stacked within the chamber;
- a horizontal platform mounted to be vertically slidable within the chamber, the platform having at least one air hole formed therethrough;
- a single resiliently compressible member mounted in the chamber between a lower side of the platform and an upper side of a base of the chamber to bias the platform towards the upper end of the chamber; and
- a tether fixed at a first end to the platform and at a second end to the base of the chamber to prevent the platform moving out of the upper end of the chamber.

The case of the present invention is advantageous as it provides a sprung display case of relatively simple and cheap construction that is capable of displaying heavy products, such as multipacks of beverages. This is primarily achieved by the combination of a single resiliently compressible member and a tether to prevent over extension of the resiliently compressible member. The use of a tether allows the resiliently compressible member, which may be a coil spring, to be significantly stronger and more resilient than the equivalent member of an apparatus according to the prior art. In particular, the resiliently compressible member of the present invention may be significantly stronger than the coil spring (4) of the prior art embodiment of FIG. 1. This can allow a case according to the present invention to avoid snaking of the resiliently compressible member, which without a tether would necessarily occur. This is particularly true if the resiliently compressible member and the tether are arranged such that the resiliently compressed member is restrained by the tether when no products are positioned upon the horizontal platform.

As will be readily understood, the case can be formed in any shape that allows products to be vertically stacked one atop another within the vertical chamber. Generally, as many products are in cuboid packaging it is likely that it will be generally preferred that the chamber has a matching shape and is also substantially cuboid.

In order to minimise the cost of the case of the present invention, it may be preferable that the platform of the case is formed of a suitable sheet material. Examples of suitable sheet material include sheet metals such as stainless steel. Sheet materials are preferred as they are relatively simple and straightforward to form and can greatly reduce the cost of a case that is produced in small volumes, for which the cost of bespoke injection moulded components would be prohibitive.

In order to allow the platform of the present invention to vertically slide within the chamber it is generally necessary that the platform has at least one air hole formed therethrough. This is because, in order for the platform to slide vertically within the vertical chamber it is necessary that air can flow past or through the platform as it is moved vertically. This can be achieved by forming at least one air hole through the platform. In order to allow good air flow through the platform and easy moving of the platform it may be preferable that a plurality of air holes are formed through the platform. As will be readily appreciated it is preferable that air holes are formed through the platform and the platform is sized and shaped such that the air holes are not blocked when products are stacked upon the platform. The at least one air hole may be sized and shaped to provide damping of the movement of the platform within the chamber. In particular, the at least one air hole may be sized such that limited air flow through and around the platform is possible and the limited air flow provides damping when the platform moves.

The resiliently compressible member of the present invention may be any suitable member apparent to the person skilled in the art. However, in the simplest and generally preferred construction the resiliently compressible member is a coil spring. In order to resist snaking as the spring is compressed, it may be preferable that the spring is formed of steel wire having a diameter of at least 8 mm. Coil springs formed of wire having a diameter less than 7 mm have been found to be more susceptible to snaking.

If the resiliently compressible member is a coil spring it is generally preferable that the tether is mounted centrally within the coil spring, so as to extend along a central vertical axis of the spring. This is preferred as when the display case is in use the action of a centrally mounted tether will be to maintain the platform in horizontal orientation and to act against snaking of the spring.

The tether of the present invention may be formed in any suitable manner apparent to the person skilled in the art. In embodiments of the invention the tether may be an inextensible chain or strap.

A case according to the present invention may be sized and shaped to house substantially any appropriate product. Nevertheless, it is believed that the present invention is particularly suitable for use with beverage multipacks, for example multipacks of beverage cans. If the case is used with beverage multipacks it is advantageous that the chamber is sized and shaped to house said products. In particular, the chamber may be sized and shaped to closely conform to the shape formed by multiple identical beverage multipacks being stacked one upon another.

As with existing sprung display cases, it is preferable that the strength of the resiliently compressible member is selected such that the uppermost product stacked on an upper side of the platform is always positioned at or about the upper end of the chamber. In this manner a customer can simply lift the uppermost product out of the upper end of the chamber and the case will then act to move the product immediately below that product to the upper end of the chamber. This can be achieved by selecting the strength of the resiliently compressible member on the basis of the specific product that the display case is to be used to display.

Further features and advantages of the present invention will be apparent from the embodiment shown in the drawings and described below.

DRAWINGS

Figure 1:
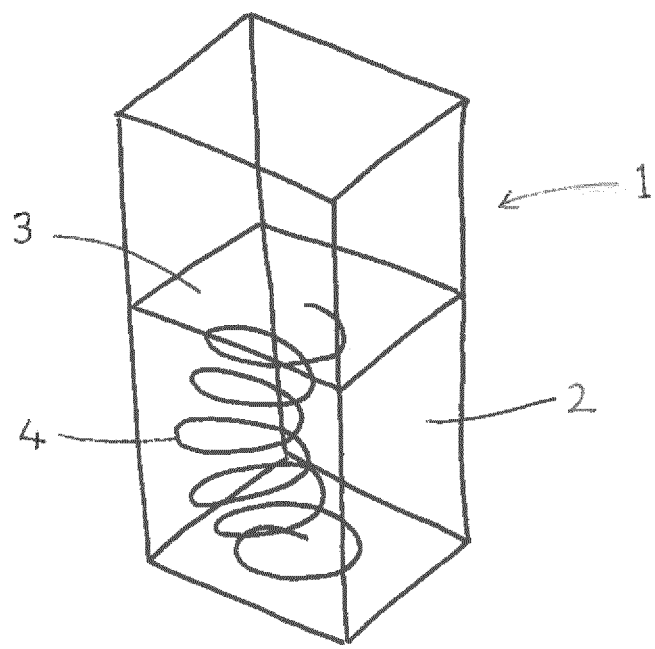
FIG. 1 is a schematic diagram of a first embodiment of a display case according to the prior art.
Figure 2:
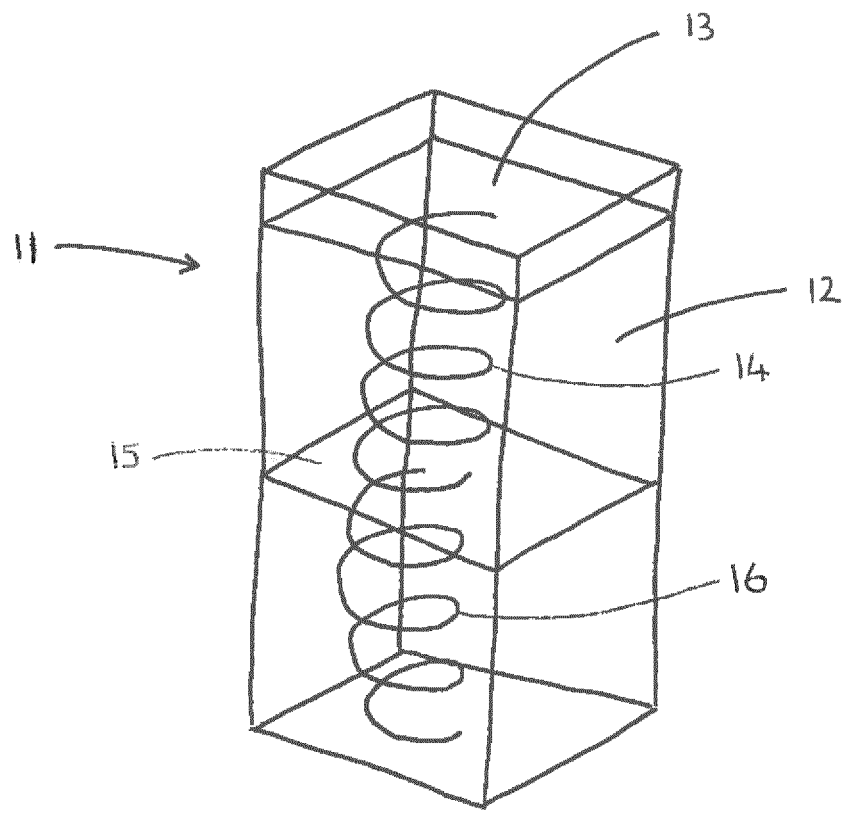
FIG. 2 is a schematic diagram of a second embodiment of a display case according to the prior art.
Figure 3:
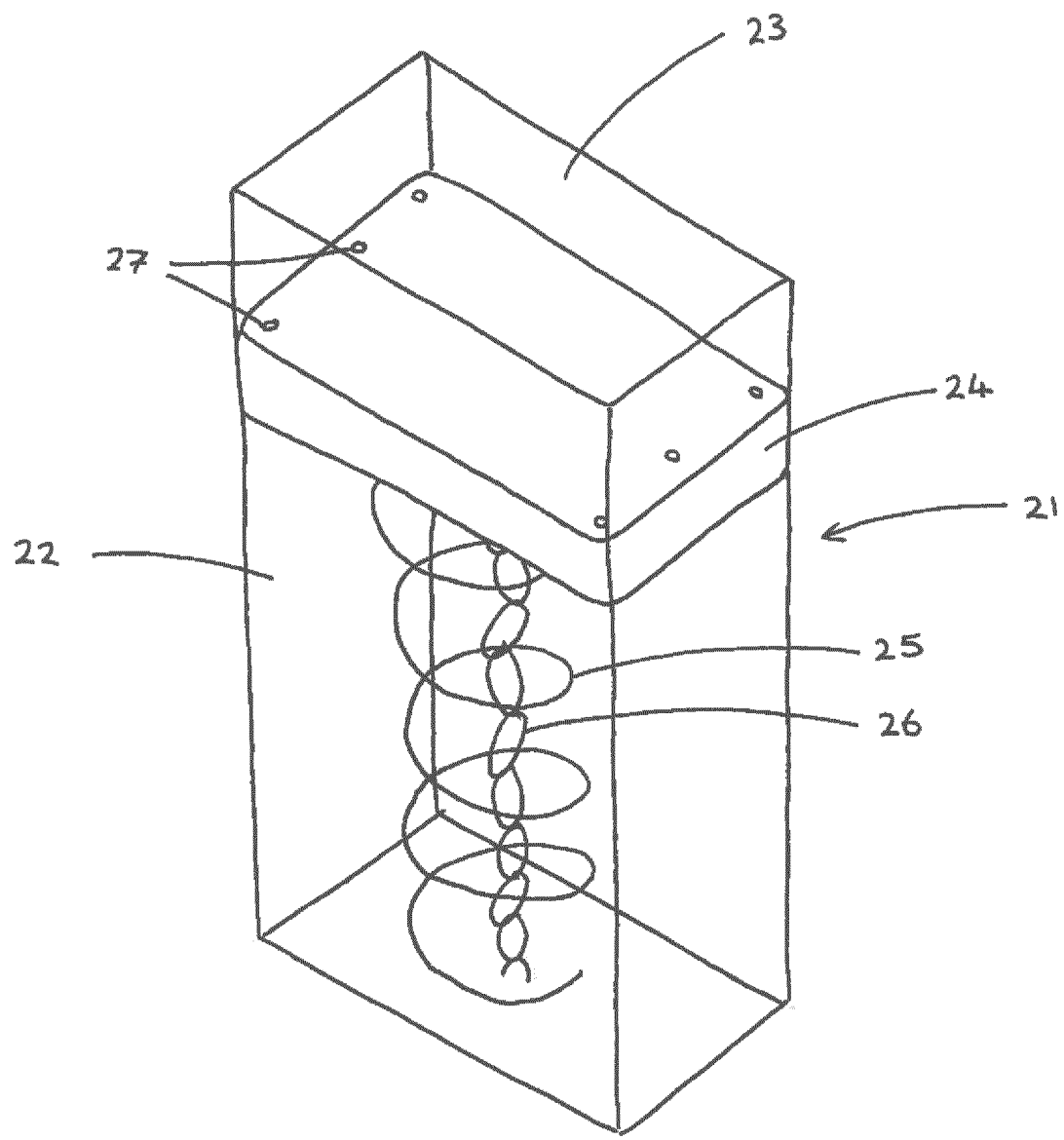
FIG. 3 is a schematic diagram of an embodiment of a display case according to the present invention.

A sprung display case 21 according to the present invention is shown in FIG. 3. The case 21 comprises a vertical chamber 22 open at an upper end 23, a horizontal platform 24 slidably mounted within the chamber 22, a coil spring 25 mounted within the chamber 22 beneath the platform 24, and a tether 26 attached at a first end to a lower side of the platform 24 and at a second end to a base of the chamber 22. The tether 26 is located centrally within the coil spring 25. The case 21 is designed to display multipack beverages.

The platform 24 is formed of sheet metal and has a plurality of air holes 27 formed therethrough to air to pass the platform 24 as it slides vertically within the chamber 22. The spring 25 is formed of steel wire having a diameter of approximately 9 mm. The tether 26 is a steel chain. The display case 21 has a height such that the upper end of the vertical chamber 22 is at a safe lifting height for the average person. When the case 21 is empty the tether 26 acts to hold the spring 25 in a compressed state and the platform 24 substantially at the upper end of the chamber 22. In particular, the tether 26 prevents the platform 24 from extending out of the upper end of the chamber 22.

The display case 21 is operated in the following manner. A plurality of identical beverage multipacks are stacked in the vertical chamber 22. When doing this the platform 24 will move vertically down the chamber 22 and the spring 25 will be compressed. The strength of the spring is such that the uppermost of the beverage multipacks will be positioned substantially at the upper end of the vertical chamber 22. If a customer wishes to purchase a multipack they can then remove the uppermost multipack from the case. When the uppermost multipack is removed the weight acting on the platform 24 and the spring 25 will be reduced and the spring will then act to move the platform 24 upwards. This will move the multipacks positioned on the platform 24 upwards until the next multipack is positioned substantially at the upper end of the chamber 22.

The airholes 27 formed through the platform 24 allow the platform to move easily along the chamber 22 under the action of the spring. The size and positioning of the airholes 27 is such that air can still flow when multipacks are positioned on the platform 24. Further, the airholes 27 are sized such that air flow through and around the platform 24 is limited to damp the movement of the platform 24. This prevents the movement of the platform 24 being too rapid.

The invention claimed is:

1. A sprung display case for dispensing products, the case comprising:
 a vertical chamber open at an upper end and sized and shaped such that a plurality of the products can be vertically stacked within the chamber;
 a horizontal platform mounted to be vertically slidable within the chamber, the platform having at least one air hole formed therethrough;
 a single resiliently compressible member mounted in the chamber between a lower side of the platform and an upper side of a base of the chamber to bias the platform towards the upper end of the chamber; and
 a tether fixed at a first end to the platform and at a second end to the base of the chamber to prevent the platform moving out of the upper end of the chamber,
 wherein the sprung display case displays beverage multipacks,
 wherein the at least one air hole in the platform is not blocked when the beverage multipacks are stacked on the platform.

2. A case according to claim 1, wherein the tether is a chain.

3. A case according to claim 1, wherein the chamber is sized and shaped to house beverage multipacks.

4. A case according to claim 1, wherein the strength of the resiliently compressible member is selected such that the uppermost product stacked on an upper side of the platform is always positioned at or about the upper end of the chamber.

5. A case according to claim 1, wherein the resiliently compressible member is arranged to be in a compressed state restrained by the tether when no products are positioned upon the horizontal platform.

6. A case according to claim 1, wherein the platform has a plurality of air holes formed therethrough.

7. A case according to claim 1, wherein the chamber is substantially cuboid.

8. A case according to claim 1, wherein the platform is formed of a sheet material.

9. A case according to claim 8, wherein the platform is formed of sheet metal.

10. A case according to claim 1, wherein the resiliently compressible member is a coil spring.

11. A case according to claim 10, wherein the spring is formed of steel wire having a diameter of at least 8 mm.

12. A case according to claim 10, wherein the tether is mounted centrally within the coil spring.

13. A case according to claim 12, wherein the tether is located centrally within the coil spring.

* * * * *